Figure 1:
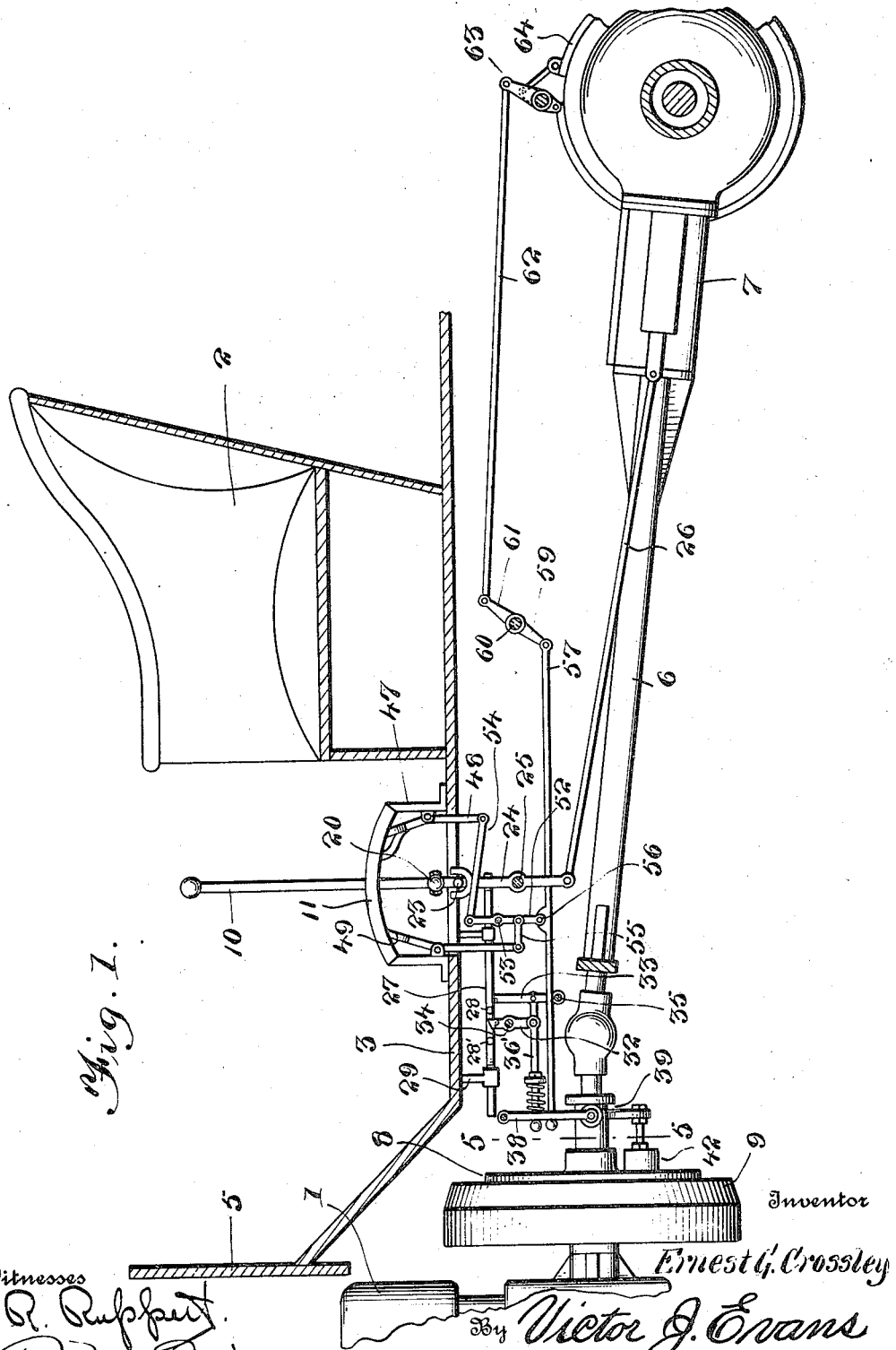

E. G. CROSSLEY.
AUTOMOBILE CONTROL SYSTEM.
APPLICATION FILED SEPT. 14, 1915.

1,193,363.

Patented Aug. 1, 1916.
3 SHEETS—SHEET 1.

Witnesses
E. R. Ruppert.
P. M. Smith.

Inventor
Ernest G. Crossley
By Victor J. Evans
Attorney

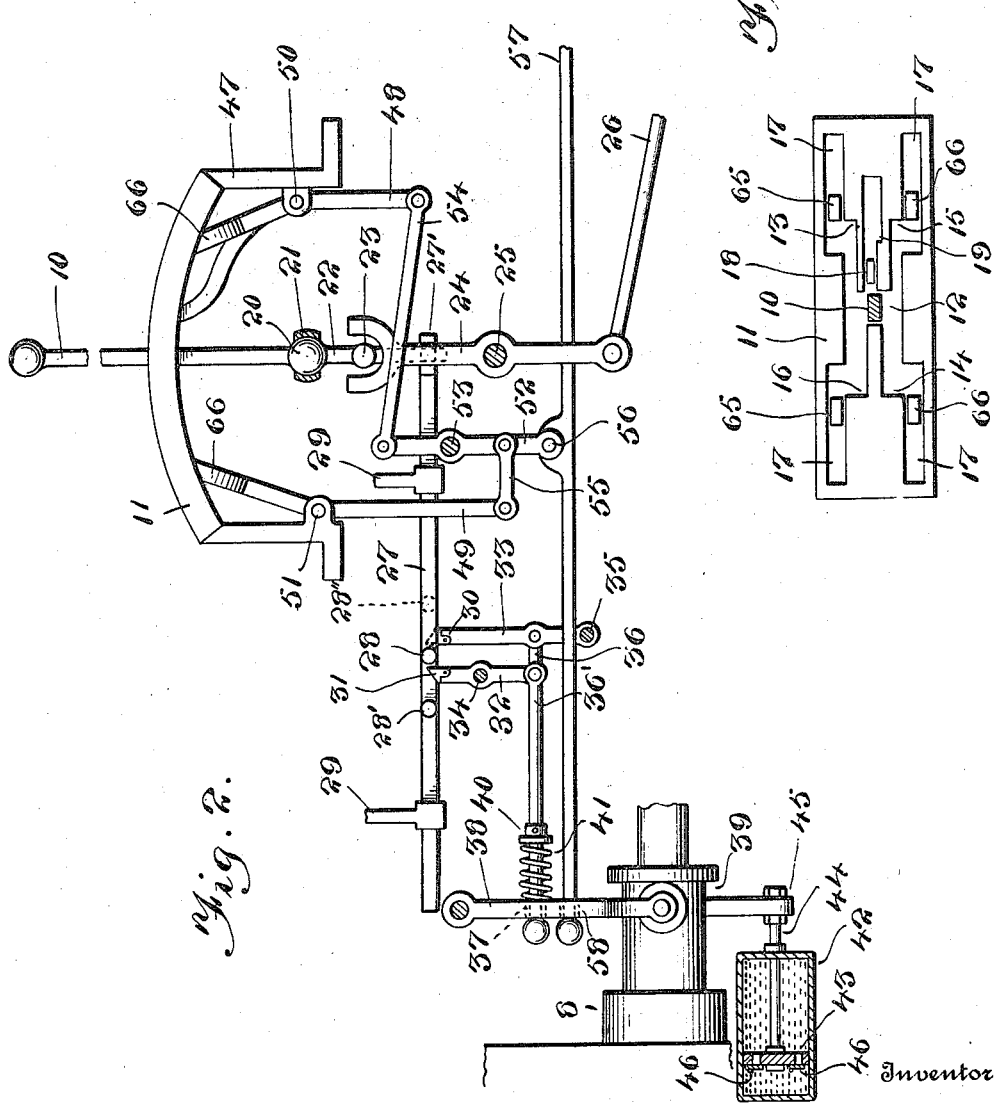

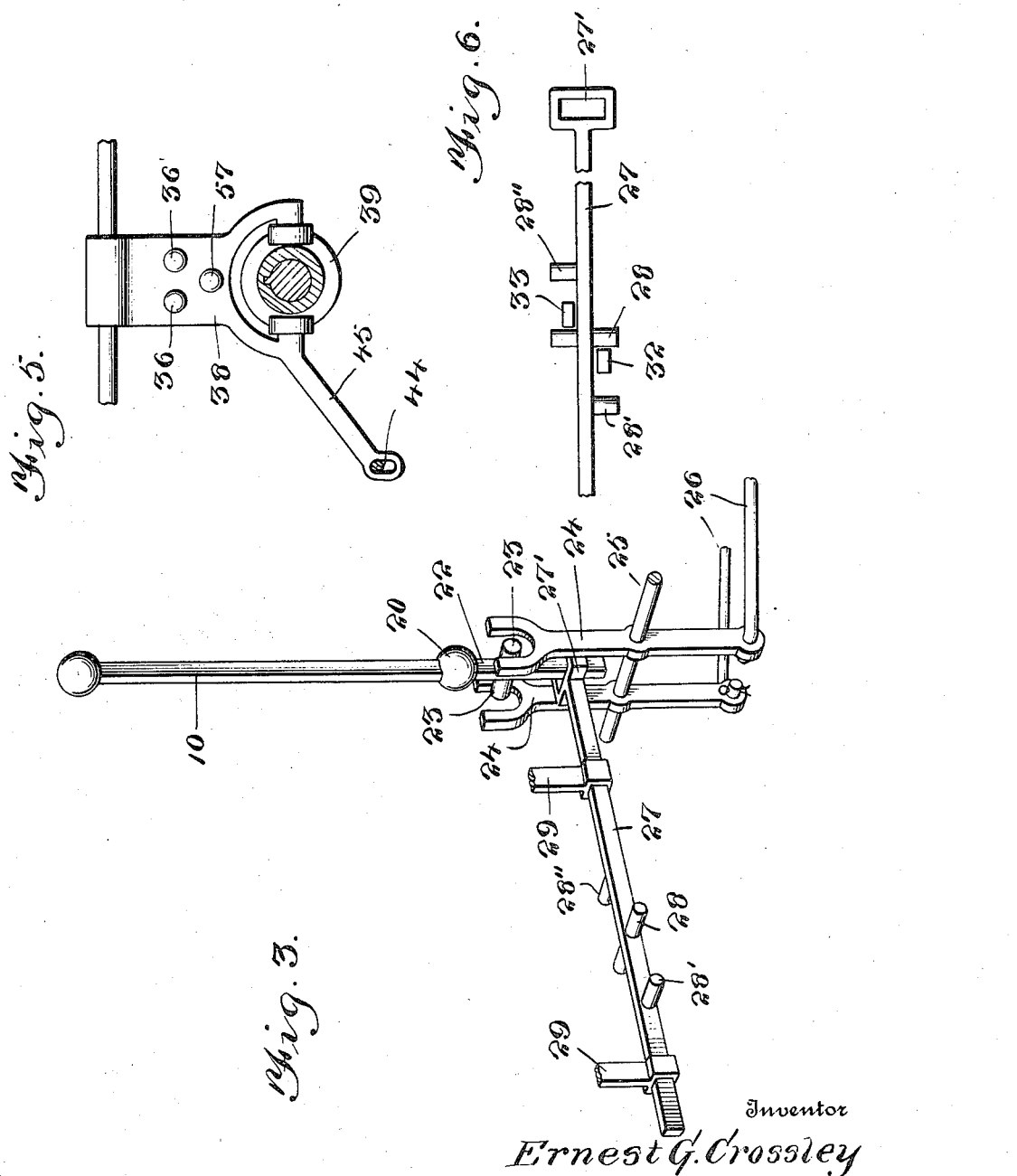

UNITED STATES PATENT OFFICE.

ERNEST G. CROSSLEY, OF STOCKBRIDGE, MICHIGAN.

AUTOMOBILE-CONTROL SYSTEM.

1,193,363.  Specification of Letters Patent.  Patented Aug. 1, 1916.

Application filed September 14, 1915. Serial No. 50,664.

*To all whom it may concern:*

Be it known that I, ERNEST G. CROSSLEY, a citizen of the United States, residing at Stockbridge, in the county of Ingham and State of Michigan, have invented new and useful Improvements in Automobile-Control Systems, of which the following is a specification.

This invention relates to automobile control mechanism, the object of the invention being to produce a control system for motor propelled vehicles in which the clutch, the brake, and the gears of the transmission gearing may be shifted and controlled by a single lever which is ordinarily operated by hand and hereinafter termed the master lever, doing away with the clutch pedal and the service brake pedal now in use.

A further object of the invention is to provide means under the control of a single lever whereby the operator can shift the speed changing gears of the transmission gearing and can also apply the brakes under any selected position of said lever, at the same time releasing the clutch and thereby enabling the car to be brought to a stop without shifting the master lever back to the neutral position, thereby providing for a quick or emergency application of the brakes.

With the above and other objects in view, the invention consists in the novel construction, combination and arrangement of parts, as herein described, illustrated and claimed.

In the accompanying drawings:—Figure 1 is a side elevation partly in section of a sufficient portion of an automobile structure to illustrate the application of the present invention thereto. Fig. 2 is an enlarged vertical longitudinal section showing the gear shifting mechanism and also the clutch and brake connections. Fig. 3 is a perspective view of the master lever, the gear shifting extension levers and adjacent parts. Fig. 4 is a plan view of the H-plate or lever guide. Fig. 5 is a vertical cross section on the line 5—5 of Fig. 1 looking rearwardly. Fig. 6 is a fragmentary horizontal section taken just above the thrust and pull bar showing the relation thereof to the clutch releasing levers.

Referring to the drawings 1 generally designates the engine of an automobile, 2 the driver's seat, 3 the floor in front of the driver's seat, 5 the dash, 6 the drive shaft housing, 7 the casing of the transmission gearing, 8 the clutch and 9 the engine fly wheel which also constitutes the female clutch member with which the male clutch member 8 coöperates in the usual way for connecting the drive shaft to the engine shaft.

In carrying out the present invention a single manually operated master lever 10 is employed to perform all of the functions and operations hereinafter particularly set forth, including the releasing of the clutch, the setting of the brakes, and the shifting of the gears of the transmission gearing to effect the usual various forward speeds and reverse.

The master lever 10 operates in conjunction with what is usually termed an H-plate 11 shown in detail plan view in Fig. 4 and comprising the central neutral space 12, the spaces 13, 14, 15 and 16 which under the standard arrangement provide for the first, second and third speed positions and the reverse position, respectively, of the gear shifting lever which in the present instance is the master lever 10. In addition to the spaces just referred to, additional brake setting spaces 17 are provided, one of said spaces 17 being provided in conjunction with each of the spaces 13, 14, 15 and 16 referred to and located under the arrangement shown in said Fig. 4. In addition to the spaces just referred to, the plate 11 comprises a longitudinal slot 18 extending rearwardly from the neutral space 12 and formed with an offset or retaining notch 19 in which the lever 10 is retained when it is desired to apply the brakes without shifting any of the gears, it being unnecessary to shift the lever 10 to a sufficient extent laterally to effect any of the gears of the transmission gearing in order to move the lever 10 along the slot 18 into the notch 19.

As shown in Fig. 3, the lever 10 has a rocker or ball and socket joint at 20 upon a fulcrum support 21 connected in any convenient way to the machine frame and below said support, the lever 10 is provided with a comparatively short arm 22 having oppositely projecting studs 23 adapted by the lateral shifting movement of the lever 10 to be thrown into engagement with one or the other of a pair of extension levers 24, the latter being pivotally mounted at 25 between their ends and being connected at their lower extremities to the forward extremities of the usual gear shifting rods 26 by means of which the speed changing gears in the transmission casing 7 are shifted.

Connected to the lower extremity of the arm 22 of the master lever is a thrust and pull bar 27 having an end loop 27' to receive the arm 22, and cross heads 28, 28' and 28", the bar 27 being held in proper line by means of guides 29 connected to the floor 3 or to any other convenient part of the frame of the machine. Arranged normally at opposite sides of the cross heads 28 are the upper extremities of two clutch releasing levers 32 and 33. The lever 32 is fulcrumed between its ends at 34 while the lever 33 is fulcrumed at its lower extremity at 35. Extending forwardly from the levers 32 and 33 are pull rods 36 and 36' which pass through and are slidable in holes 37 in a clutch shifting member 38 shown in the form of a shifting fork, the forked portion of which engages a groove 39 in a collar on the drive shaft to which the clutch member 8 is fastened. It will be understood that two rods 36 and 36' are employed, there being one rod for each of the levers 32 and 33. Each of said rods is provided with a fixed collar 40 between which and the shifting member 38 a helical expansion take up spring 41 is interposed.

The upper extremity of the lever 33 carries a pivoted dog 30 to engage the cross head 28 of the bar 27 so that when the bar 27 is drawn in a rearward direction, the rod 36 attached to the lever 33 is also drawn rearwardly thereby shifting the member 38 in a corresponding direction and releasing or throwing out the clutch 8. The upper extremity of the other lever 32 also carries a pivoted dog 31 to engage the cross head 28 so that when the bar 27 is thrust in a forward direction, the rod 36' connected with the lever 32 is drawn rearwardly with the same result just stated namely, the clutch shifting member 38 is drawn backwardly so as to release or throw out the clutch 8. Now it will be understood that when the master lever 10 is either pushed in a forward direction or pulled in a rearward direction, the same effect is produced on the clutch shifting member 38, to release or throw out the clutch member 8 and thereby disconnect the drive shaft from the engine shaft. This movement takes place before the actual shifting of the gears in the transmission gearing into coöperative relation to each other to produce the desired speed when the clutch is again allowed to assume its operative position. In order to prevent the clutch member 8 from being thrust too quickly into the female clutch member by means of the usual clutch holding spring (not shown), I provide a dash pot 42 containing a piston 43 the rod 44 of which is connected at 45 to the clutch shifting member 38. The piston 43 is provided with check valves 46 which allow the piston to be drawn back to release the clutch without resistance, the valves closing, however, in the opposite movement of the piston to prevent the member 8 of the clutch from being thrust too quickly into the clutch member 9 thus avoiding the sudden grabbing of the clutch, the objection as to which is readily understood to those familiar with the art to which this invention appertains.

Extending downwardly from the H-plate or lever guide 11 is a pendent bracket or hanger 47 upon which are pivotally mounted a pair of brake and clutch actuating members 48 and 49 shown in the form of levers fulcrumed at 50 and 51, respectively.

52 represents a brake rod shifting member also shown in the form of a lever which is fulcrumed at 53 on the bracket or hanger 47. The member 48 is connected by a pivotal link 54 to the upper extremity of the member 52, also the member 49 is connected by a pivotal link 55 to the member 52 below the fulcrum point 53. The member or lever 52 is extended below the point of attachment of the link 55 where it is pivotally connected at 56 to a clutch releasing and brake applying rod 57. This rod 57, as shown in Fig. 1, extends through and is slidable in an opening 58 in the clutch shifting member 38 above described so that when the rod 57 is moved rearwardly, the clutch is released or thrown out. At its rear end the rod 57 is connected to an arm 59 on a rocking brake shaft 60 provided with other arms 61 from which connecting rods 62 extend to the arms 63 of brake shoes or bands 64 such as are now used in automobile practice on the drums of the rear or driving wheels.

Each of the members or levers 48 and 49 has its upper end bifurcated to provide two terminal engaging portions 65 and 66 lying in two of the opposite spaces 17 of the lever guide or H-plate 11. Therefore, it matters not into which of the spaces 17 the lever is moved, it will come in contact with and actuate one of the branches or terminals 65 or one of terminals 66. There are, therefore, four contact points between the lever 10 and the two levers or brake and clutch actuating members 48 and 49.

From the foregoing description, taken in connection with the accompanying drawings, the operation of the mechanism will now be understood. If the operator desires to start the car, he moves the master lever 10 to one side and then rearwardly until it occupies the space 13 of the H-plate. In doing this, he causes one of the rods 36 to draw the clutch shifting member 38 rearwardly thereby releasing or throwing out the clutch and immediately thereafter the gears in the transmission case are shifted to the selected speed and the clutch setting spring acts to return the clutch to its operative position which movement is, however, retarded by the action of the dash pot 42 thereby preventing the clutch from taking hold or grabbing too quickly. While the lever 10 is in the position referred to, namely in the space 13, should the operator desire to apply the brakes in an emergency, he merely moves the lever farther in the same general direction until it occupies the adjacently located space 17 whereupon the lever 48 operates through the connections described to move the rod 57 rearwardly which has the effect of throwing out or releasing the clutch and applying the brakes by reason of the connections hereinabove particularly described. What has been described with relation to the lever 10 and the space 13 is true with regard to any of the other spaces 14, 15 and 16 representing, respectively, second and high speed and reverse.

It will thus be seen that a single lever hereinbefore termed a master lever controls the shifting of all the gears, the releasing or throwing out of the clutch, and the application of the brakes. Therefore, the operation of an automobile or other motor vehicle is greatly simplified, dispensing with the usual service brake lever, clutch lever and, if desired, what is known as the usual emergency brake lever. The lever 10 may be used as an emergency brake lever by simply moving the same rearwardly through the slot 18 into the retaining notch 19 without effecting a shifting of any of the gears in the transmission case.

What I claim is:—

1. The combination with the gear shifting hand lever of an automobile, of a brake setting element arranged in the path of said lever and adapted to be actuated by said lever when the latter is shifted beyond its gear selecting position.

2. The combination with the gear shifting hand lever of an automobile, of a plurality of brake setting elements arranged in the path of said lever and adapted to be actuated by said lever when the latter is shifted beyond any of its gear selecting positions.

3. The combination with the gear shifting hand lever of an automobile, of a brake setting and clutch releasing element arranged in the path of said lever and adapted to be actuated by said lever when the latter is shifted beyond its gear selecting position.

4. The combination with the gear shifting hand lever of an automobile, of a plurality of brake setting and clutch releasing elements arranged in the path of said lever and adapted to be actuated by said lever when the latter is shifted beyond any of its gear selecting positions.

In testimony whereof I affix my signature in presence of two witnesses.

ERNEST G. CROSSLEY.

Witnesses:
E. B. OSTRANDER,
PAUL C. DANCER.